Dec. 28, 1926.

B. J. GOLDSMITH ET AL 1,612,430

WINDOW

Filed March 24, 1925        2 Sheets-Sheet 1

INVENTOR
Bertram J. Goldsmith.
Emil Koeb.
BY Townsend + Decker
ATTORNEYS.

Dec. 28, 1926.
B. J. GOLDSMITH ET AL
1,612,430
WINDOW
Filed March 24, 1925
2 Sheets-Sheet 2
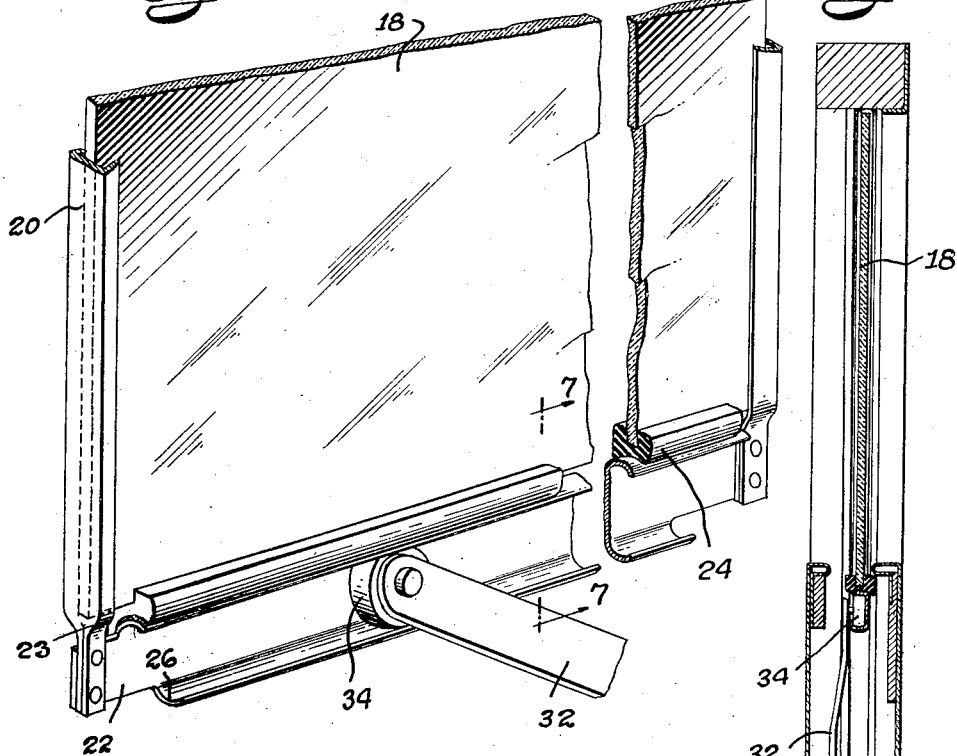
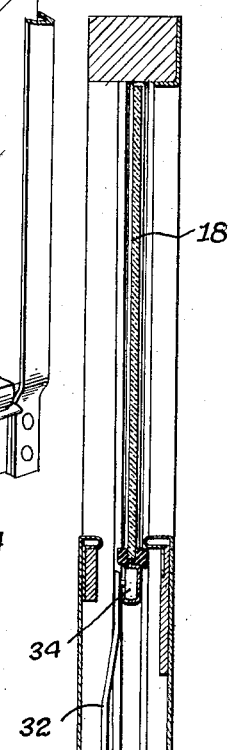
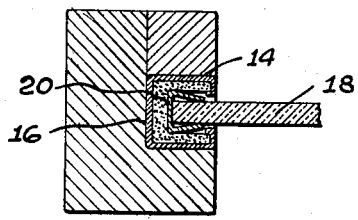
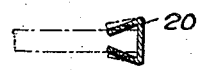
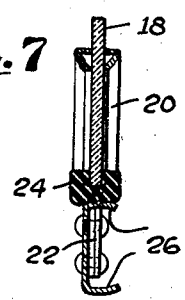
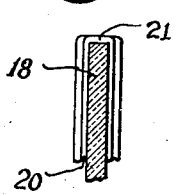
INVENTOR
Bertram J. Goldsmith.
BY Emil Koeb.
Townsend + Decker
ATTORNEYS Patented Dec. 28, 1926.

1,612,430

UNITED STATES PATENT OFFICE.

BERTRAM J. GOLDSMITH, OF NEW YORK, AND EMIL KOEB, OF TUCKAHOE, NEW YORK, ASSIGNORS TO PERFECT WINDOW REGULATOR CORPORATION, OF LONG ISLAND CITY, NEW YORK, A CORPORATION OF DELAWARE.

WINDOW.

Application filed March 24, 1925. Serial No. 17,913.

This invention relates to improvements in windows and supporting and operating mechanisms therefor and is particularly adapted for use in closed automobile constructions.

It is a primary object of the invention to form a guiding support for the closure, usually formed of glass, so that the closure will be adequately supported for its movements without the likelihood of the glass being broken during its installation or use.

It is a further object to firmly support the window so that it will not tend to rattle and so that an air-tight seal can be maintained at the sides of the window.

Another object of the invention is to forego the difficulties arising from wide variations in thickness of glass by placing a member along the sides of that glass and sliding with it, the maximum width of which does not vary with the thickness of glass.

A further object is to produce a connection between the glass and its moving device which will not loosen from the glass.

Other and more specific objects and advantages will appear as the description proceeds.

Referring to the drawings:

Fig. 3 is a perspective view of the closure and the supporting frame therefor.

Fig. 4 is a sectional view substantially on the line 4—4 of Fig. 1.

Fig. 5 is a sectional view of one edge of the closure taken on the line 5—5 of Fig. 1.

Fig. 6 is a sectional view of one side supporting member before the installation of the closure.

Fig. 7 is a section substantially on the line 7—7 of Fig. 3.

Fig. 8 is a sectional view of the upper portion of the window and its retaining channel.

There has long been experienced considerable difficulty in so supporting the glass in automobile doors and body members that the glass is not subject to undue twisting strains and at the same time to adequately support the glass. With this objection to prior installations in view the structure described below has been developed.

Figure 1:
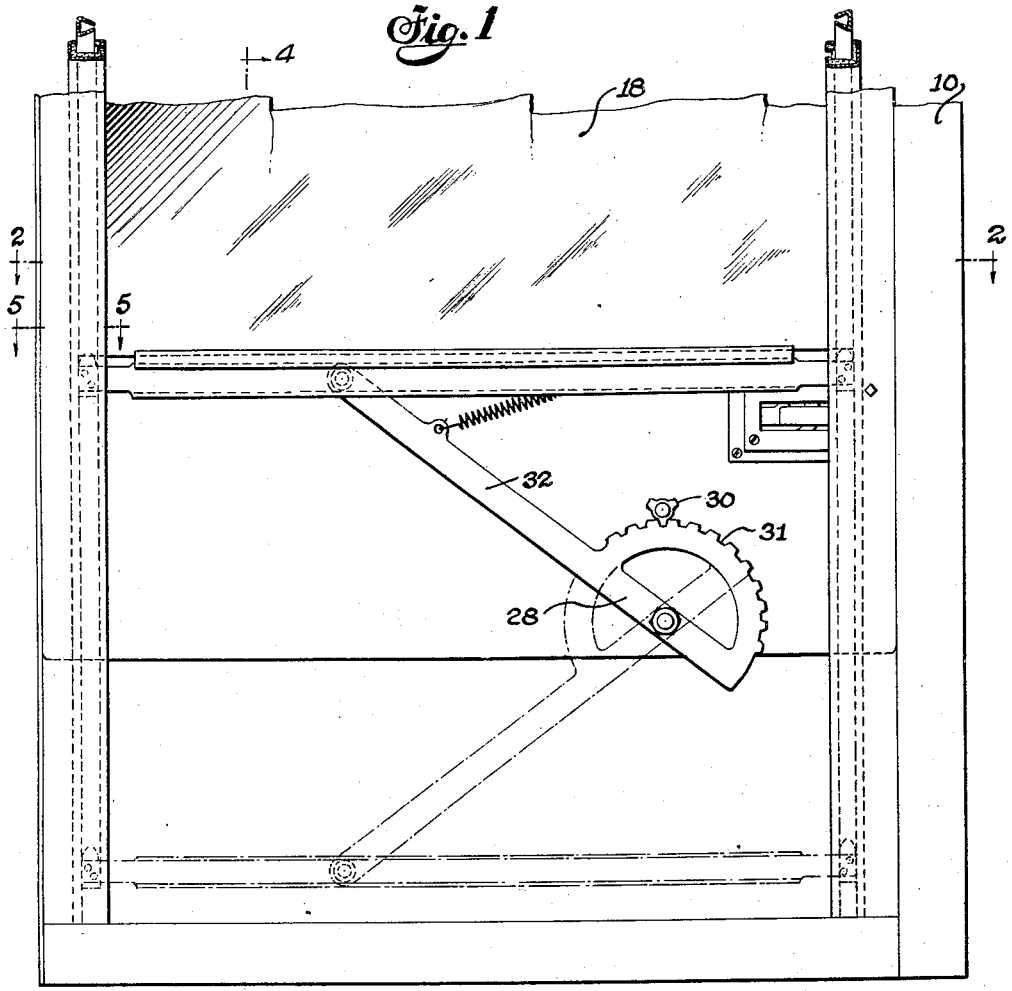
Fig. 1 represents an elevation of a body member of an automobile with our invention applied thereto.
Figure 2:
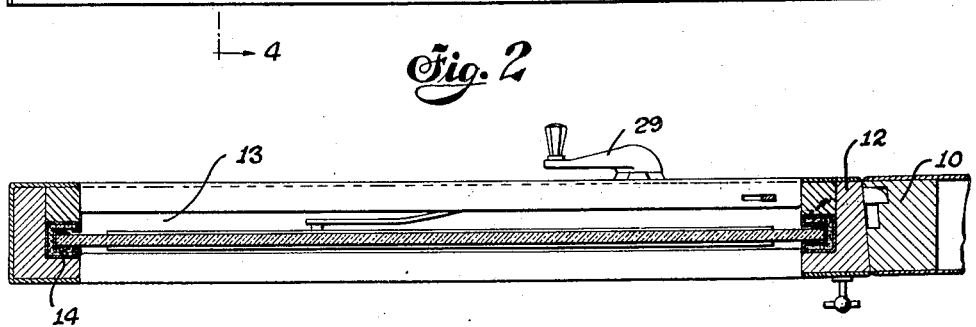
Fig. 2 is a section substantially on the line 2—2 of Fig. 1.

There is shown in Fig. 1 certain parts of an automobile body 10 for the purpose of illustrating our invention. The invention is shown as applied to the door member 12 although it is to be understood that it may be applied equally well to an immovable part of the body proper. The door 12 has the usual window well 13 and is provided with fixed guide members 14 in the form of channels, the inner portions thereof being lined with felt or other shock absorbing material 16. The closure 18 comprises a section of plate glass and is adapted to be movably supported in the fixed guides 14 as hereinafter set forth.

The support for the window 18 is formed with two inwardly opening channel members 20 rigidly connected to the base member 22. The channel members 20 have the free edges of the flanges thereof arranged, when in unmounted position, slightly closer together than the thickness of glass 18. This necessitates spreading the channels slightly when installing the glass so that the glass will always be firmly clamped between the flanges of the channel members in spite of variations in the thickness of the glass. In Fig. 6 there is shown the position of the flanges of channel 20 before and after the installation of the window. The upper and lower ends of the channels 20 are closed as indicated at 21 and 23 respectively so that the channels engage the top and bottom as well as the sides of the window. The cross member 22 is rigidly connected to the channels 20 so as to form a rigid supporting frame, the window glass being clamped in the channels and resting upon the cross members 22. A suitable rubber or other shock absorbing member 24 is preferably mounted between the window and the base member 22 and projecting to form a dam for engagement with the window ledge. The member 22 has outwardly extending flanges 26 forming a guideway for the window operator hereinafter referred to.

The window operator indicated generally at 28 may be of any desired character and in the form shown comprises an operating handle 29 carrying an operating gear 30 meshing with a segment 31 on the operating arm 32. The outer or free end of the operating arm 32 is preferably provided with a roller 34 mounted between the flanges 26 so that upon operation of the handle 29 the window may be moved to open or closed position.

It will be seen that by the construction above described the window 18 engaged by the channels 20 and supported principally by the cross member 22 will be under substantially no strain during its installation or use. The guides 20 serve as reinforements for the window and constitute an additional protection against breakage. The resiliency of the channels 20 allows them to fit window glasses of various thicknesses and insures a tight connection between the channels and the window so as to prevent any noise between these parts and also to form a tight seal between the window and its supporting frame.

While we have shown and described a certain embodiment of our invention it is to be understood that this is merely illustrative and that we are to be limited only as set forth in the appended claims.

We claim as our invention:

1. In combination with a body member having an opening therein, a closure for said opening, means for gripping and supporting said closure, said means including connected side and base members, said side members comprising yielding gripping channels constructed to yieldingly grip and to be moved with said closure and means for moving said closure.

2. In combination with a body member having an opening therein, fixed guides formed in said body member adjacent the edges thereof, a closure for said opening, a support for said closure mounted for movement with said closure in said guides and including inwardly opening channel members, and a cross member connecting the same, said channel members being adjustable in width and resiliently gripping said closure.

3. In a window, a frame, guideways carried by said frame, a closure member sliding in said guideways, channel members attached to and slidable with said closure member, said channel members having relatively wide body portions of fixed width and relatively narrow flanged portions of adjustable width to permit said channels to yieldably accommodate themselves to the thickness of said closure member without affecting their fitting in said guideways.

4. In combination with a window consisting of a frame having guideways and a slidable closure therein, channels attached to and travelling with said closure, said channels embodying inwardly inclined side walls constructed for yieldable engagement with said closure and a rigid base secured to said channels.

5. In a window, a frame, guideways carried by said frame, a closure member slidable in said guideways, channel members attached to and slidable with said closure member, said channel members having body portions of fixed width and inwardly inclined securing flanges having the free edges thereof adjustable to permit said channels to yieldably accommodate themselves to the thickness of said closure member without affecting their fitting in said guideways.

6. In a window, a frame, guideways carried by t' ↑ frame, a closure member slidable in said guideways, and channel members attached to and slidable with said closure member, said channel members having stop elements engaged above the upper edge of said closure for securing said closure member against longitudinal movement with respect to said channel members.

7. In a window, a frame, guideways carried by the frame, a closure member slidable in said guideways, side members attached to and slidable with said closure member, and a cross member rigidly connected to said side members, said cross member being spaced beneath said closure member and being operatively attached thereto by means of said side members.

8. In a window, a frame, a closure slidable in said frame, channel members attached to and slidable with said closure, a cross member positioned beneath said closure and secured to said channel members, said cross member having the body portion thereof arranged in a substantially vertical plane and provided with a transversely extending flange, and means normally engaged with said flange for controlling the position of said closure.

9. In a window, a frame, a closure slidable in said frame, side guide members attached to and slidable with said closure, a cross member positioned beneath said closure in spaced relation thereto and secured to said side guide members, and a resilient dam positioned in the space between said closure and cross member.

10. In a window, a frame, a closure slidable in said frame, closure supporting means slidable with said closure, said means comprising side channels and a cross member rigidly secured together, said side channels having the free ends thereof obstructed to prevent longitudinal movement of said closure with respect to said channels and including resilient flanges constructed to engage and hold the side edges of said closure, said side channels possessing sufficient flexibility to permit displacement of the free ends thereof for the insertion of said closure.

11. In a window, a frame, a closure slidable in said frame, channel members attached to and slidable with said closure, a cross member positioned beneath said closure and secured to said channel members, said channel members including transverse stop elements adjacent the upper and lower ends thereof constructed to normally prevent longitudinal withdrawal of said closure from said channels.

Signed at New York in the county of New York and State of New York this 23rd day of March A. D. 1925.

EMIL KOEB.
BERTRAM J. GOLDSMITH.